June 9, 1931.  E. BECKER  1,809,154
RIVETING
Filed June 30, 1928  2 Sheets-Sheet 1
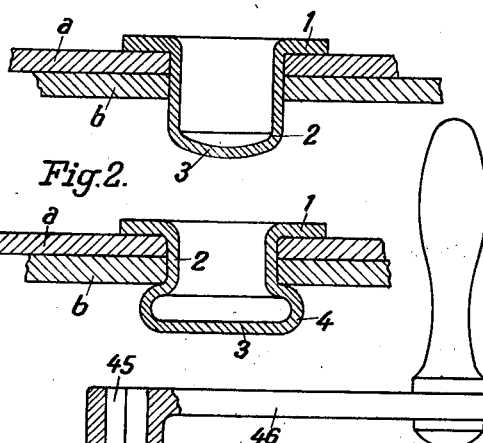
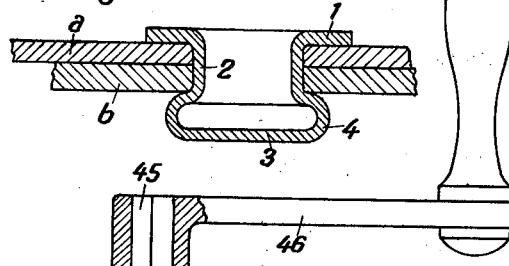
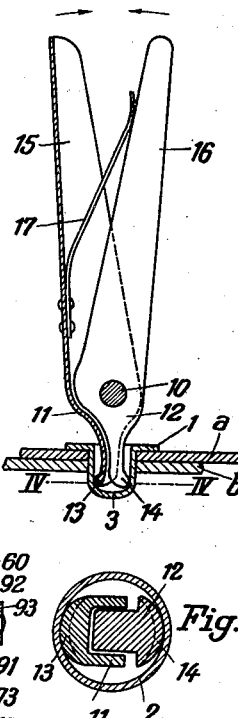
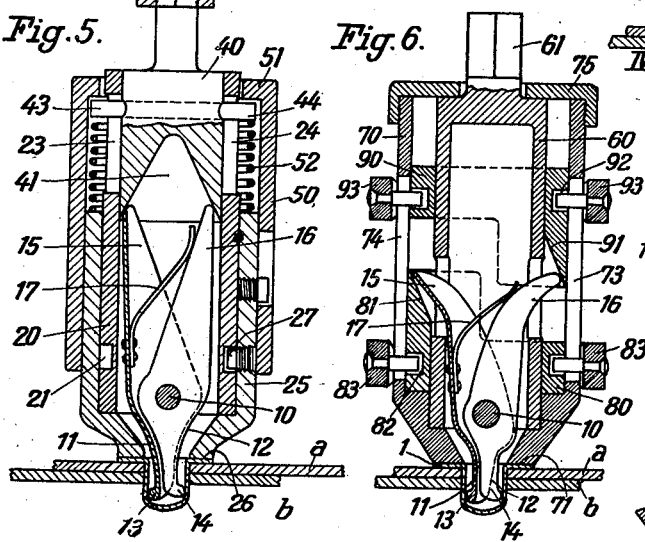
Inventor:
Emil Becker June 9, 1931.  E. BECKER  1,809,154
RIVETING
Filed June 30, 1928  2 Sheets-Sheet 2
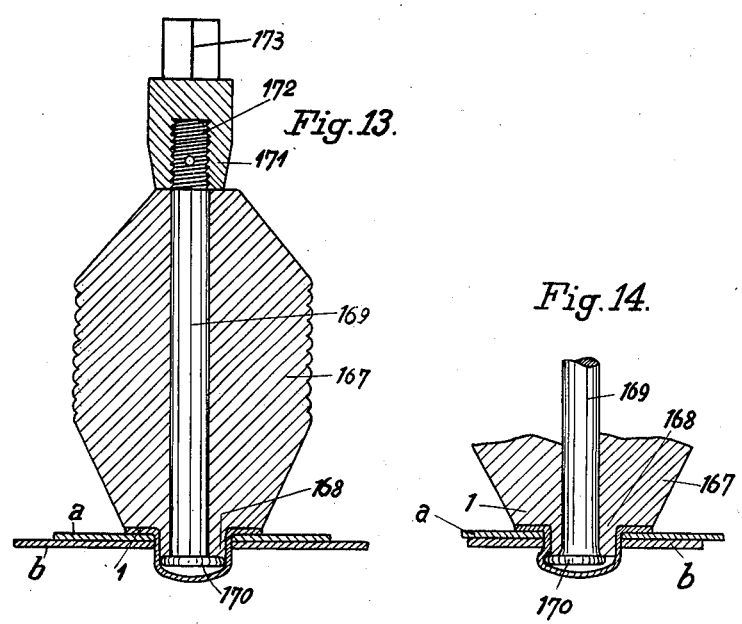
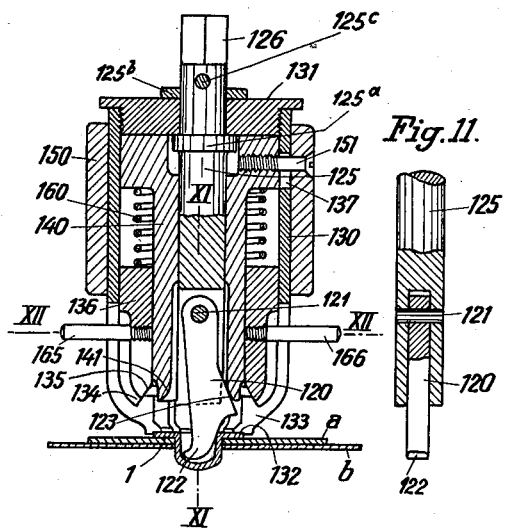
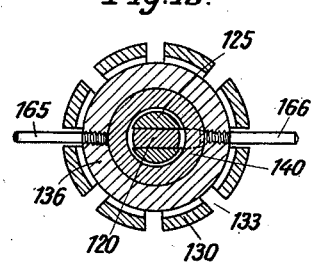
Inventor:
Emil Becker Patented June 9, 1931

1,809,154

UNITED STATES PATENT OFFICE

EMIL BECKER, OF DESSAU, GERMANY, ASSIGNOR TO HUGO JUNKERS, OF DESSAU, GERMANY

RIVETING

Application filed June 30, 1928, Serial No. 289,481, and in Germany July 16, 1927.

My invention relates to the art of riveting and more particularly to the riveting of joints by means of hollow or tubular rivets. It is an object of my invention to improve the riveting by means of hollow rivets.

In the riveting of parts which are accessible only from one side, it has already been suggested to employ hollow tubular rivets which are inserted from the accessible side, the closing head being then formed by means of tools inserted into the rivet and projecting on the other side. It is true that in this manner parts can be connected by rivets on which the normal method of riveting could not be practised, but it involves the drawback that each tubular rivet leaves a hole which is objectionable in many cases, for instance in tanks. The closing of these holes, though they may be small, is rather difficult and not always reliable. Therefore the use of tubular rivets was hitherto only a limited one.

According to my invention, a rivet is used, which while being hollow, is open only at one end and closed at the other end. It is inserted from the accessible side with its closed end first, and through the medium of a tool inserted into the rivet the closed projecting end of the rivet is expanded beyond the diameter of the rivet hole to form the closing head, which at the same time covers the rivet hole.

Tools for use in connection with these rivets may be designed in various ways. They may for instance resemble tongs having two long and two short arms and a projection at the end of each short arm. The short arms are inserted into the rivet in contact with the projecting closed end or bottom of the rivet and are then forced outwards by applying pressure to the long arms or handles. The projections formed on the short arms will then expand and bead over the rivet wall near the closed end so as to form a hollow flange. By thus acting on the inner wall of the rivet on varying points of the perimeter of the rivet a hollow annular bead is formed which acts as a closing head.

Instead of performing this operation in successive stages it may be performed continuously by rotating the arms of the tool while forcing the short arms apart.

Instead of two arms a single arm may be provided for cooperation with an abutment resting on a part of the rivet which is not deformed, a projection on the end of the arm performing the expanding or beading operation.

The tool may also be provided with a cam formed on a rotary spindle, the beading operation being performed by rotating the spindle or the cam on this spindle.

In the drawings affixed to this specification and forming part thereof a rivet and various tools embodying my invention are illustrated diagrammatically by way of example.

In the drawings,

Figs. 1 and 2 are axial sections of a rivet before and after fixation in place, respectively, Fig. 3 is an elevation, partly in section of a tongs-like beading tool having two arms, Fig. 4 is a section on the line IV—IV in Fig. 3, drawn to a larger scale, Fig. 5 is an axial section of a similar tool combined with means for operating same, Fig. 6 is an axial section of a modification, Fig. 7 is an elevation of the tool illustrated in Fig. 6, drawn to a smaller scale, Fig. 8 is a detail section showing a modification which may be adapted to the lower end of either of the tools shown in Figs. 5 or 6 and 7, respectively, Fig. 9 is a plan view of a rivet the flange of which is formed so as to fit the modified tool according to Fig. 8, Fig. 10 is an axial section of a tool having a single beading arm, Fig. 11 is a detail view partly in section on the line XI—XI in Fig. 10, Fig. 12 is a section on the line XII—XII in Fig. 10, Fig. 13 is a section of a tool having a spindle and a cam formed thereon and Fig. 14 is a similar view of the cam end of this tool in a different position.

Referring to Figs. 1 and 2, $a$ and $b$ are the two parts such as two metal sheets, to be connected by riveting. The rivet has the form of an open pot 2 with a flange 1 surrounding the rim, 3 being the bottom, while the wall is preferably cylindrical. The closed or bottom end of the rivet projects beyond the part $b$ on the inaccessible side of the joint and is expanded into the closing head 4 as shown in Fig. 2, by means of any one of the tools which will now be described.

Referring to Fig. 3, 11 and 12 are the two short arms of a tongs-like instrument which are pivoted about a pin 10, and 13, 14 are projections formed at the end of the short arms, while 15 and 16 are the long arms or handles. 17 is a spring tending to move the handles 15, 16 apart.

In the operation of the tool the arms 11, 12 are inserted in the rivet from the accessible side until they abut against the bottom end of the rivet wall. The handles 15, 16 are now forced against each other in the direction of the arrows, thereby forcing the arms 11, 12 apart and expanding the projecting part of the rivet by means of the projections 13, 14. The tool is applied and operated in various positions in succession so that the rivet is beaded uniformly around its perimeter.

Figs. 5, 6 and 7 illustrate tools in which an instrument such as illustrated in Fig. 3 is operated automatically by rotating a crank. The parts of the instrument are marked with the same reference numerals as in Fig. 3.

Referring first to Fig. 5, 20 is a sleeve in which the pin 10 is secured, 25 is a casing in which the sleeve 20 is rotatably mounted, 26 is a flat face at the operating end of the tool with which it is applied against the flange of the rivet, 27 is a check engaging an annular groove 21 in the sleeve so as to secure it against axial displacement, 40 is a plug adapted to move axially in the upper end of the sleeve 20 and formed with a hollow conical cam face 41 at its lower end for engaging the ends of the handles 15, 16. 43, 44 are the projecting ends of a pin inserted in the plug 40; 23, 24 are slots in the sleeve 20, 52 is a spring resting on the end face of casing 25 with one end and on the pins 43, 44 with the other. 50 is a cylinder shell secured on the casing 25, 51 is an inwardly projecting flange on the upper end of the shell which limits the upward movement of the pins 43, 44 of plug 40, 45 is a square on a spindle fixed to plug 40, and 46 is a crank for rotating the spindle.

In the operation of this tool the casing 25 is placed on the flange of the rivet, the projections 13, 14 entering the hollow rivet. The cylinder 50 is now depressed and the crank 46 is rotated. The depression of the cylinder causes a downward movement of plug 40, wherein cam 41 forces the handles 15, 16 against each other and the short arms 11, 12 apart. The rotation of the crank is transmitted to the sleeve 20 by the pins 43, 44 and, through the medium of the pin 10, to the instrument, causing the projections 13, 14 to rotate while being forced apart, and thereby expanding or beading the rivet wall to form the closing head. When the operation is finished, the cylinder 50 is released and the spring 52 moves the plug 40 upwardly into its initial position, permitting the spring 17 to force the handles 15, 16 apart and to return the projections 13, 14 into their inoperative position so that the tool can be extracted from the rivet.

In the tool illustrated in Fig. 5 pressure is exerted on the parts to be riveted by the reaction of the spring 52. This may be undesirable in some cases, for instance, in riveting tanks having very thin walls. This drawback is avoided in the tool illustrated in Figs. 6 and 7 in which means are provided for spreading the handles apart without exerting axial pressure on the tool. The pin 10 of the instrument is secured in a sleeve 60, the handles 15, 16 projecting through parallel slots in the sleeve, 61 is a square on the sleeve for the application of a crank, 70 is the outer shell, 75 is a cover on the upper end of the shell which supports the upper end of the sleeve 60, its lower end abutting against a shoulder in the casing, and 71 being a face on the lower end of the shell which corresponds to the face 26 in Fig. 5. 80 and 90 are annular cams inserted between the sleeve 60 and the casing 70, the cams being splined on the sleeve 60 but adapted to be displaced axially thereon in opposite directions. Each cam is provided with an inclined face 81 and 91, respectively, which engage with one of the parts 15, 16 of the unit, and annular grooves 82, 92 are formed in the cams 80, 90, to be engaged by pins on the ends of double-armed levers 83, 84 and 93, 94, respectively, which project outwardly through slots 73 in the shell 70. 83, 93 are the shorter arms of another tongs-like instrument, pivoted at 100, and 84, 94 are handles, 101 being a spring inserted between the handles to force them apart.

In operation the tool is applied onto the flange 1 of the rivet, the handles 15, 16 of the beading instrument being spread apart so that the projections 13, 14 can enter the rivet. The handles 84, 94 are now forced together against the action of spring 101 and the crank on the square 61 is rotated. The movement of the handles 84, 94 causes the cam 90 to descend and the cam 80 to ascend so that the handles 15, 16 are forced together, the projections 13, 14 being forced apart and beading the rivet to form the closing head. In this operation no axial pressure is exerted on the tool as the forces for moving the cams 80, 90 are balanced.

In order to prevent rotation of loose rivets in contact with the rotating projections 13, 14, the end of the tool may be provided with projections 110, 111 (Fig. 8) which engage corresponding notches 112, 113 in the flange of the rivet.

The tool shown in Figs. 10, 11 and 12 comprises but a single beading arm 120 having a projection 122, and an inclined face 123 on the side opposite the projection 122. 121 is a pin on which the arm 120 is pivoted, 125 is a shaft in the slotted lower end of which the arm 120 is inserted, 130 is a casing, 131 is a cover on the top of the casing in which the shaft 125 is rotatably carried and held against axial displacement by a flange 125a, a washer 125b and a split pin 125c. 126 is a square on the end of the shaft, 132 is an annular groove in the lower end of the casing 130 which casing is divided into a plurality of tabs at its lower end by parallel slots 133 as shown in Fig. 12 so as to impart to it a certain resiliency and to chuck the flange 1 as will be described hereinafter. 136 is a slide inserted in the casing 130 and adapted to be displaced axially therein, 140 is a hollow plug in which the shaft 125 is fitted to rotate, 141 is a hollow cam face on the lower end of the plug which is adapted to engage the face 123 on the arm 122, 160 is a spring inserted between the upper end of the slide 136 and a shoulder on the plug 140, 150 is a cylinder adapted to be displaced on the outside of the casing 130, 151 is a screw connecting the plug 140 with the cylinder 150, 137 is a slot in the casing 130 for the screw 151 to move in, 165, 166 are pins on the slide 136 projecting through one of the slots 133 on either side of the tool, 134 are conical faces on the tabs of the sleeve 130, 135 is a corresponding conical face in the lower end of the slide 136.

In operation, before the tool is placed on the flange 1 of the rivet, the slide 136 is retracted by the pins 165, 166 so as to open the chuck. The pins are then released, allowing the spring 160 to advance the slide 136 and to close the chuck through the medium of its conical face 135 acting on the faces 134 of the tabs. Now the cylinder 150 and with it the plug 140 are depressed while at the same time the shaft 125 is rotated. The face 141 of the plug 140 acts on the inclined face 123 of the arm 120 and moves its projection 122 into operative position. Any relative displacement of parts under the one-sided pressure of the projection 122 and rotation of the rivet with the projection, are prevented by the chuck.

Referring now to Figs. 13 and 14, this tool comprises a body 167 having a spigot 168 at its lower end which fits exactly the cavity of the rivet. 169 is a spindle arranged eccentrically with respect to the spigot 168, 170 is a cam on the lower end of the shaft 169, 171 is a boss in which the threaded upper end 172 of the spindle is inserted, and 173 is a square on the upper end of the boss for rotating the spindle 169. The cam 170 has about the same diameter as the cavity of the rivet and the eccentricity of the spigot 168 and the spindle 169 is such that the spigot and the cam coincide radially in a certain position as shown in Fig. 13 so that the cam permits insertion of the spigot.

In operation the tool with the cam in the position illustrated in Fig. 13 is inserted into the rivet with the spigot 168, the body 167 is gripped by one hand and the spindle 169 is rotated with the other. The cam 170, as shown in Fig. 14, now projects on one side of the spigot 168 and expands the rivet in that point, the reaction being absorbed by the spigot 168 and the wall of the rivet which is held against deformation by the walls of the holes in the parts a, b. The body 167 is turned repeatedly about the axis of the spindle and the operation of the spindle is repeated until a uniform bead has been obtained.

Obviously instead of a crank for manual operation, I may provide mechanical means, such as a motor, particularly for operation on comparatively large rivets.

I wish it to be understood that I do not desire to be limited to the exact details of construction shown and described for obvious modifications will occur to a person skilled in the art.

I claim:—

1. The method of making a joint by riveting comprising inserting in the rivet holes of the parts to be joined a hollow pot-shaped body flanged at its open end and exerting pressure in radial direction on the inner wall of the projecting closed end of said body to increase its diameter beyond the diameter of said rivet holes.

2. The method of making a joint by riveting comprising inserting in the rivet holes of the parts to be joined a hollow pot-shaped body flanged at its open end and expanding from within the projecting closed end of said body in a plurality of radial planes in succession to increase its diameter beyond the diameter of said rivet holes.

3. The method of making a joint by riveting comprising inserting in the rivet holes of the parts to be joined a hollow pot-shaped body flanged at its open end and expanding by a continuous rotary movement of a tool within the projecting closed end of said body to increase its diameter beyond the diameter of said rivet holes.

In testimony whereof I affix my signature.

EMIL BECKER.